No. 879,765. PATENTED FEB. 18, 1908.
E. H. GREENLEAF & T. A. DISSEL.
SUPPORT FOR ELECTRIC SERVICE WIRES AND CABLES.
APPLICATION FILED JULY 23, 1907.
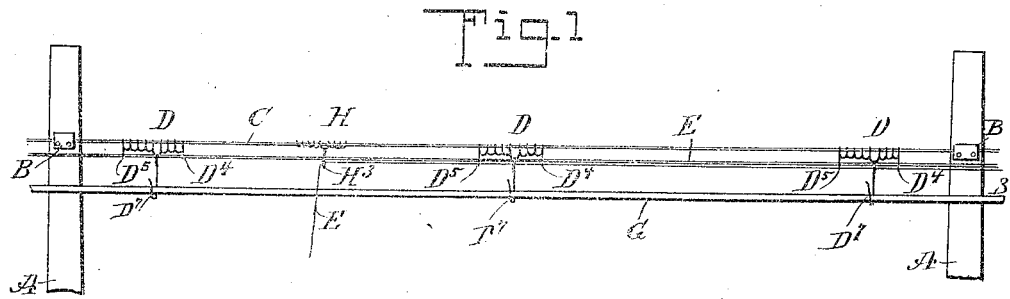
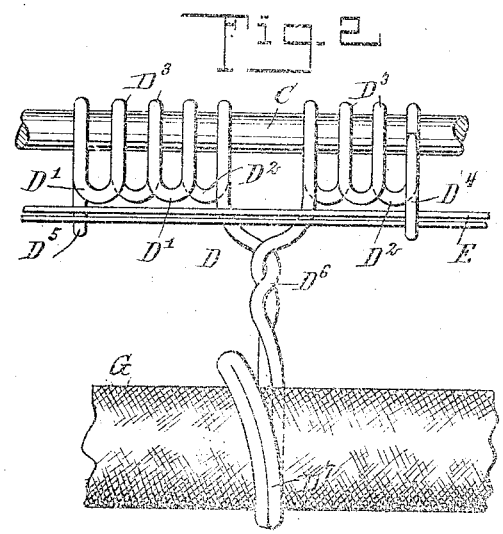
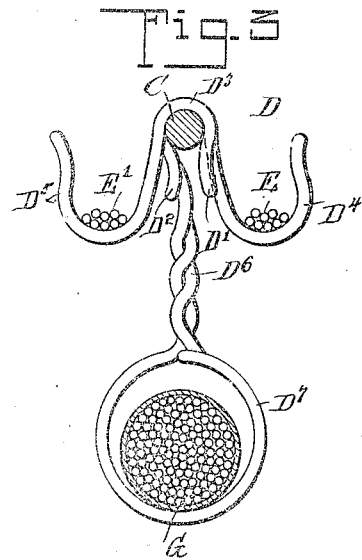
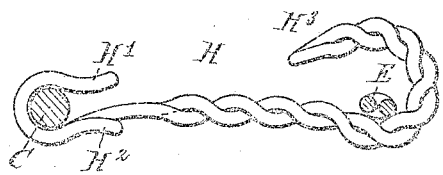
WITNESSES
INVENTORS
Edward H. Greenleaf
Theodore A. Dissel
BY Munn & Co.
ATTORNEYS

UNITED STATES PATENT OFFICE.

EDWARD HIRAM GREENLEAF AND THEODORE AUGUSTINE DISSEL, OF NEWBURGH NEW YORK.

SUPPORT FOR ELECTRIC SERVICE WIRES AND CABLES.

No. 879,765.

Specification of Letters Patent.

Patented Feb. 18, 1908.

Application filed July 23, 1907. Serial No. 385,098.

*To all whom it may concern:*

Be it known that we, EDWARD H. GREENLEAF and THEODORE A. DISSEL, citizens of the United States, and residents of Newburgh, in the county of Orange and State of New York, have invented a new and Improved Support for Electric Service Wires and Cables, of which the following is a full, clear, and exact description.

The invention relates to overhead supports for electric service wires and cables, such as are used in suburban and country telephone systems and the like.

The object of the invention is to provide a new and improved support for electric service wires and cables, arranged to permit of quickly and securely fastening the supports in place on a span wire or the like, to allow of conveniently laying the service wires or twisted pairs in position in the supports and drawing the cables in position, and to permit of running any one of the service wires or twisted pairs to a house from any point along the line.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement arranged as an overhead support for telephone wires and cables; Fig. 2 is an enlarged side elevation of the same; Fig. 3 is a cross section of the same, and Fig. 4 is a cross section of the improvement, showing more particularly the running-off hook for running a service wire or twisted pair to a house at any point of the line.

The poles A are provided with the usual clamping devices B for supporting a span wire C on which are sprung the supporting devices D for carrying sets of service wires or twisted pairs E and E', and also for supporting a cable G, as hereinafter more fully explained. Each of the supporting devices D is formed of a single piece of spring wire bent to form a gripping device adapted to be sprung by an operator on to the span wire C to firmly attach the supporting device D by its own resiliency to the span wire C and without the use of the other fastening means or other manipulations on the part of the operator.

The gripping device is formed by bending the piece of wire into coils $D'$ $D^2$, alternately on opposite sides and connected with each other by top cross-members or saddles $D^3$, it being understood that when the supporting device D is sprung in place, the coils $D'$, $D^2$ by their own resiliency firmly grip opposite sides of the span wire C while the top members or saddles $D^3$ rest on top of the span wire C. The end coils terminate in curved or trough-shaped arms $D^4$, $D^5$, extending transversely in opposite directions on opposite sides of the span wire C, as plainly indicated in Fig. 3, the said arms $D^4$, $D^5$ being adapted to carry the sets of service wires or twisted pairs E, and E' laid in the open arms, as will be readily understood by reference to Fig. 3. Now by having the open arms $D^4$, $D^5$ at the ends of each support D and extending in opposite directions on opposite sides of the span wire C, two sets of service wires or twisted pairs can be conveniently placed in position and supported, without disturbing the equilibrium of the support or loosening the same on the span wire C. The single piece of wire of which each support D is made has its middle portion preferably formed into a depending twist $D^6$ terminating in an open loop $D^7$ through which a cable G is drawn by the use of a rope, the loop supporting the said cable. The piece of spring wire is double at the loop $D^7$ to form a broad support for the cable G and the loop is open and has its terminal bent to one side to allow of conveniently placing the rope in position in the loop, preliminary to drawing the cable into position by the use of the rope.

By the arrangement described a large number of service wires or twisted pairs as well as a heavy cable can be readily supported by the improvement, and by constructing the supporting devices D in the manner described they can be readily snapped or sprung into place by hand, as the alternating clamping coils $D'$, $D^2$ firmly grip the opposite sides of the span wire C, to hold each support against movement in any direction.

When it is desired to run one of the service wires or twisted pairs E or E' from the line to a house, then use is made of a running-off hook H, made of a single piece of wire and bent into clamping coils H', H², similar to the clamping coils D', D² previously mentioned, and likewise engaging the span wire C, as plainly indicated in Figs. 1 and 4. A portion of the wire forming the running-off hook H is twisted, and the twisted portion is bent into a hook H³ extending sidewise, for the passage of the service wire or twisted pair E or E', to conduct the same from any point of the line to the house, as will be readily understood by reference to Fig. 1. Now by having the running-off hook H constructed in the manner above set forth, it is evident that it can be conveniently placed by the operator in position at any point along the span wire C, to suit existing conditions.

By having the arms D⁴, D⁵ arranged in the manner described, it is evident that the service wires or twisted pairs can be conveniently laid by the line-men, in position on the supports, and by having the loops D⁷ constructed in the manner set forth, it is evident that the cable G can be readily drawn through the said loop D⁷ by the use of the ordinary drawing rope.

The supporting devices D as well as the running-off hooks H can be very cheaply constructed and readily placed in position by a line-man without the use of special tools or the like.

Having thus described our invention, we claim as new and desire to secure by Letters Patent:

1. A support for electric service wires and cables comprising a span wire and a device for carrying the wires or cables, the device having coils adapted to be sprung in place on the span wire to engage the same by the resiliency of the members of the coils, to hold the device in place on the span wire.

2. A support for electric service wires comprising a span wire and a device having coils and supporting arms for the service wires, the coils being adapted to be sprung in place on the span wire to hold the device in place thereon, and the said arms being arranged to receive and hold the service wires.

3. A support for electric service wires comprising a span wire and a device having coils and a depending loop for the reception of service wires or cables, the coils being adapted to be sprung in place on the span wire to hold the device in place thereon, and the said depending loop being arranged to permit of placing a drawing rope in position therein for drawing the cable into the said loop.

4. A support for electric service wires comprising a span wire and a device having coils and supporting arms for the service wires, the coils being adapted to be sprung in place on the span wire to hold the device in place thereon, the said arms being arranged to receive and hold the service wires, and the said coils being connected with each other by cross pieces forming a saddle adapted to rest on the top of the span wire.

5. A support for electric service wires comprising a span wire and a device having coils and a depending loop for the reception of service wires or cables, the coils being adapted to be sprung in place on the span wire to hold the device in place thereon, the said depending loop being arranged to permit of placing a drawing rope in position therein for drawing the cable into the said loop, and the said coils being connected with each other by cross pieces forming a saddle adapted to rest on the top of the span wire.

6. A support for electric service wires comprising a span wire and a device having coils and a sidewise extending open hook, the coils being adapted to be sprung in place on the span wire to hold the device in place thereon and the said open hook being adapted to receive a service wire and deflect the same to one side of the main line.

7. A support for electric service wires made from a single piece of wire bent to form a gripping device consisting of a plurality of clamping coils alternating on opposite sides of the support and adapted to grip by their own resiliency, a span wire, the coils being connected at the top by cross pieces forming a saddle for engagement with the top of the span wire.

8. A support for electric service wires, made from a single piece of wire bent to form a gripping device consisting of a plurality of clamping coils alternating on opposite sides of the support and adapted to grip by their own resiliency a span wire, the coils being connected at the top by cross pieces forming a saddle for engagement with the top of the span wire, the said single piece of wire terminating in a sidewise extending open arm for the reception of the service wires or twisted pairs.

9. A support for electric service wires, made from a single piece of wire bent to form a gripping device consisting of a plurality of clamping coils alternating on opposite sides of the support and adapted to grip by their own resiliency a span wire, the coils being connected at the top by cross pieces forming a saddle for engagement with the top of the span wire, the said single piece of wire being bent to form a depending loop for the reception of a service wire or cable.

10. A support for electric service wires made from a single piece of wire bent to form a gripping device consisting of a plurality of clamping coils alternating on opposite sides of the support and adapted to grip by their own resiliency a span wire, the coils being connected at the top by cross pieces forming a saddle for engagement with the top of the span wire, the said single piece of wire being bent to form a depending loop for the reception of a service wire or cable, the single piece of wire being doubled at the said loop.

In testimony whereof we have signed our names to this specification in the presence of two subscribing witnesses.

EDWARD HIRAM GREENLEAF.
THEODORE AUGUSTINE DISSEL.

Witnesses:
THEO. G. HOSTER,
EVERARD B. MARSHALL.